United States Patent [19]

Matsumura et al.

[11] 3,768,966

[45] Oct. 30, 1973

[54] PROCESS FOR PRODUCING LACTONIZED ACRYLIC FIBERS

[75] Inventors: Yasuo Matsumura; Kunio Maruyama, both of Okayama, Japan

[73] Assignee: Japan Exlan Company Limited

[22] Filed: Nov. 11, 1971

[21] Appl. No.: 197,936

[30] Foreign Application Priority Data
Dec. 29, 1970 Japan.............................. 45/129275

[52] U.S. Cl. .................................. 8/115.7, 8/115.5
[51] Int. Cl. ..................... D06m 9/00, D06m 11/02
[58] Field of Search ......................... 8/115.5, 115.7

[56] References Cited
UNITED STATES PATENTS 3,123,434   3/1964   Blomberg............................ 8/115.5
3,124,413   3/1964   Lowes................................. 8/115.5
3,515,706   6/1970   Minato et al................... 260/85.5 R FOREIGN PATENTS OR APPLICATIONS
998,677   7/1965   Great Britain ...................... 8/115.5

Primary Examiner—Richard D. Lovering
Attorney—E. F. Wenderoth et al.

[57] ABSTRACT

The present invention relates to a process for producing lactonized acrylic fibers having a high Young's modulus and improved elongation at break by treating an acrylic fiber made from an acrylic copolymer containing at least 50 percent by mol of acrylonitrile and a monomer having a hydroxyl group and/or a monomer capable of forming a hydroxyl group in an acid medium at a pH of not more than 2, said medium containing an organic and/or inorganic acid present in such concentrations as to avoid swelling or dissolving the treated material.

10 Claims, No Drawings

PROCESS FOR PRODUCING LACTONIZED ACRYLIC FIBERS

This invention relates to a process for producing lactonized acrylic fibers. More particularly, it relates to a process for producing lactonized acrylic fibers having a high Young's modulus and improved elongation at break by acid-treating under specific conditions a fiber made from an acrylic copolymer containing acrylonitrile and a monomer having a hydroxyl group and/or a monomer capable of forming a hydroxyl group so that a specific amount of lactone unit may be formed in said fiber.

We have already disclosed in U.S. Pat. No. 3,515,706 that when an acrylic copolymer consisting of acrylonitrile and a monomer having a hydroxyl group and/or a monomer capable of forming a hydroxyl group is treated in a medium containing an acid in a concentration of not more than 40 percent at a pH of not more than 2, there are selectively found lactone rings in the copolymer.

However, in order to produce fibers from a lactonized acrylic copolymer obtained by such previously proposed process, it is necessary to well wash with water and the polymer after the lactonizing reaction. In case this washing is insufficient an organic solvent such as dimethyl-formamide, dimethylacetamide or gamma-butyrolactone, or a concentrated aqueous solution of a thiocyanate used as a solvent for said polymer for forming a spinning solution will be undesirably modified or decomposed by the remaining acid and therefore it is difficult to obtain a satisfactory spinning solution.

Further, even in case such washing is conducted completely, the elongation at break of the fiber to be obtained from such polymer will be lower than that of an ordinary acrylic fiber, e.g. about one-half to two-thirds the latter, and therefore it will be very difficult to make bulky yarns of said fibers. That is to say, generally, in producing a bulky yarn, a spun yarn is made by mixing a restretched fiber and a non-restretched fiber and is then dry or wet-heat-treated so that the shrinkage difference between them may be utilized. In such case, the higher the restretching magnification of the fiber, the higher the shrinkage by the subsequent heat-treatment and therefore a fiber product excellent in the bulkiness will be obtained. On the other hand, in case the elongation at break of the fiber is low, if the restretching magnification is made high, the fiber will break, and therefore only a fiber of a low stretching magnification will be able to be made and it will be difficult to obtain an excellent bulky yarn. Thus, a fiber obtained from a lactonized acrylic polymer produced by such conventional method as is described above has a high Young's modulus but is so low in the elongation at break that it has been difficult to make an excellent bulky yarn of such fiber.

We have now found that, when the lactonizing treatment carried out conventionally on a polymer is carried out on a fiber produced from said polymer, the elongation at break of the lactonized acrylic fiber will be remarkably improved.

A principal object of the present invention is to obtain a lactonized acrylic fiber having improved fiber characteristics.

Another object of the present invention is to obtain a lactonized acrylic fiber elevated in the Young's modulus at the normal temperature and in hot water and improved in the stress deformation while being improved in the elongation at break and retaining the other desirable features of acrylic fibers.

Another object of the present invention is to obtain a lactonized acrylic fiber improved in such fiber properties as the elongation at break and Young's modulus by making a fiber of an acrylic copolymer containing acrylonitrile and a monomer having a hydroxyl group and/or a monomer capable of forming a hydroxyl group and then lactonizing the copolymer so that at least 1 percent by weight of lactone unit is introduced into said fiber.

Other objects of the present invention will become apparent from the following description.

The above mentioned objects of the present invention are attained by treating a fiber or fiber product made from an acrylic copolymer containing acrylonitrile and a monomer having a hydroxyl group and/or a monomer capable of forming a hydroxyl group in a medium, at a pH of not more than 2, containing an organic acid and/or inorganic acid in a concentration not swelling or dissolving said fiber so that at least 1 percent by weight of lactone unit is introduced into said fiber.

The lactone unit introduced into the fiber by such lactonizing reaction has the following structure:

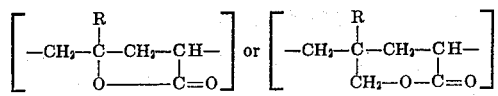

wherein R represents hydrogen or a methyl group, formed by an esterifying reaction of a COOH group formed from a CN group of an acrylonitrile unit with an OH group of a monomer unit having a hydroxyl or an OH group formed from a monomer unit capable of forming a hydroxyl group.

With the introduction of less than 1 percent of said unit, the object of the present invention can not be well attained. Therefore, in the present invention, it is necessary to introduce into the fiber at least 1 percent by weight of the above mentioned lactone unit. Further, when a very remarkable effect by the introduction of the lactone unit into the fiber is desired, it is preferable to introduce more than 3 percent by weight of the lactone unit.

The upper limit of the content of the above mentioned lactone unit in the fiber should be determined by the degree of the improvement of the physical properties of the resulting fiber. However, generally, it is desirable that the content of such lactone unit is less than 30 percent by weight, preferably less than 25 percent by weight.

The lactonized acrylic fiber obtained according to the present invention has an elongation at break much higher than that of a fiber obtained by spinning a conventional lactonized acrylic polymer, and yet retains an elongation at break substantially as high as that of an ordinary acrylic fiber. Therefore the fiber of this invention has such characteristic physical properties of fibers as an improved Young's modulus, strength and stretchability in hot water without losing the usual features of acrylic fibers, while retaining a remarkable flame-resistance and hence being very low in the production of toxic gases when burnt.

The fiber to be lactonized in the present invention is a fiber formed by an ordinary wet or dry-spinning process from an acrylic copolymer obtained by copolymerizing acrylonitrile, a monomer having a hydroxyl group and/or a monomer capable of forming a hydroxyl group and, in some case, such monomer copolymerizable with acrylonitrile in so far as not obstructing the lactonizing reaction as, for example, allylsulfonic acid or methallylsulfonic acid or its salt, styrene or such halogen-containing monomer as vinyl chloride, vinylidene chloride or vinyl bromide, by using a well known polymerizing catalyst.

The lactonizing treatment according to the present invention may be applied to a gel fiber having has the solvent removed as much as possible, a fiber subjected to such after-treatment as stretching, drying and collapsing or a fiber in such form as spun yarn or knitted or woven fabric or the like.

For the above described lactonizing treatment according to the present invention, it is necessary to employ an acid in such concentration that will neither swell nor dissolve the fiber. When an acid concentration which exceeds the above concentration, that is to say, which will dissolve or swell the fiber is adopted, various physical properties of the treated fiber will be deteriorated. Particularly, when a severe acid-treating condition in which the acid concentration exceeds 40 percent by weight is adopted, impure structure such as of carboxylic acid or acid amide will be likely to be produced in the copolymer forming the fiber. Such impure structure causes the discoloring of the copolymer and is not desirable. However, even in case an acid of a high concentration is used, the coloring of the lactonized acrylic fiber can be prevented by properly adjusting other lactonizing conditions or adding a discoloring preventive.

The lower limit of the acid concentration to be used in the lactonization reaction is not critical. However, when the pH value becomes higher than 2, the progress of the lactonizing reaction will become slow. Therefore, it is not desirable to employ a pH higher than 2.

The acid to be used in the lactonization treatment of the present invention may be either an inorganic acid or an organic acid. However, an acid high in the dissociation constant of $H^+$ ions, for example, such inorganic acid as sulfuric acid, hydrochloric acid, nitric acid, perchloric acid, phosphoric acid or chlorosulfonic acid or such organic acid as chloracetic acid, formic acid, toluenesulfonic acid or phenolsulfonic acid is preferable. Such acids may well be used not only as alone but also as mixed.

When nitric acid is used as alone or as mixed with any other acid, the lactonizing reaction will proceed easily but the fiber will be discolored and undesirably modified. Therefore, it is preferable to inhibit such discoloring and modification. For this purpose, oxyacids of chlorine or their salts such as, for example, perchloric acid, chloric acid, chlorous acid or hypochlorous acid or its salt of Na, K or Ca may be added to the treating medium. The amount thereof is preferably about 0.1 to 5 percent by weight based on the treating medium.

In order to accelerate the lactonizing reaction according to this invention, it is also possible to add, as an accelerator, a metallic ion which can form a complex with nitrile group. The reaction time can be remarkably reduced by using such accelerator.

The amount of the lactone unit to be introduced into the fiber can be freely determined by properly selecting lactonizing conditions such as the kind and concentration of the acid, treating temperature and treating time. However, particularly, in order to prevent the discoloring and undesirable modification of the acrylic fiber, it is preferable to employ a treating temperature within a range above the secondary transition point (glass transition temperature) of the fiber to be treated as wet but below 200°C., more preferably within a range from 50° to 150°C.

The monomer having a hydroxyl group referred to in the present invention is such monomer copolymerizable with acrylonitrile as allyl alcohol or methallyl alcohol. Further, the monomer which can produce a hydroxyl group is such monomer copolymerizable with acrylonitrile and capable of producing a hydroxyl group by being decomposed under the lactonizing conditions as vinyl or allyl compounds of carboxylic acids having one to 21 carbon atoms or ethers and substituted compounds thereof with halogen atoms, hydrocarbon groups or halohydrocarbon groups having one to 20 carbon atoms. Preferable compounds are vinyl carboxylates, allyl carboxylates, vinyl hydrocarbyl or halohydrocarbyl ethers and allyl hydrocarbyl or halohydrocarbyl ethers, said hydrocarbyl or halohydrocarbyl group having one to 20 carbon atoms.

Examples of said preferred unsaturated ester of carboxylic acid having one to 21 carbon atoms are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylate, vinyl stearate, vinyl levulinate, ethylvinyl oxalate, vinyl chloroacetate, vinyl dichloroacetate, vinyl benzoate, vinyl cyclohexane-carboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, α-methallyl acetate, β-methallyl acetate, γ-methallyl acetate, methallyl propionate, methylmethallyl oxalate, γ-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl ether, β-chlorovinyl methyl ether, β-bromovinyl methyl ether, vinyl ethyl ether, isopropenyl ethyl ether, β-chlorovinyl ethyl ether, β-bromovinyl ethyl ether, vinyl 2-chloroethyl ether, vinyl trifluoroethyl ether, vinyl propyl ether, vinyl isopropyl ether, β-chlorovinyl isopropyl ether, vinyl butyl ether, β-chlorovinyl butyl ether, vinyl isobutyl ether, β-chlorovinyl isobutyl ether, β-bromovinyl isobutyl ether, vinyl tert-butyl ether, vinyl neopentyl ether, vinyl n-hexyl ether, vinyl 2-ethyl-hexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-napthyl ether, vinyl benzyl ether, vinyl p-chlorobenzyl ether, vinyl αα-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tert-butyl ether, allyl octyl ether, allyl phenyl ether, allyl p-chlorophenyl ether, allyl 2-chlorophenyl ether, allyl 2,4-dichlorophenyl ether, allyl α-naphthyl ether, allyl benzyl ether, methallyl methyl ether, methallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used.

The acrylic copolymer containing such monomer having a hydroxyl group and/or monomer capable of forming a hydroxyl group may be obtained by a well known suspension-polymerization, emulsion-polymerization or solution-polymerization process.

The proportions of the acrylonitrile, monomer having a hydroxyl group and/or monomer capable of forming a hydroxyl group and any other unsaturated monomer which may be introduced when desired, are determined properly depending on the amount of the lactone unit desired to be formed or the desired amount of introduction of the above-mentioned unsaturated monomer. Generally, it is preferable that the acrylic copolymer contains more than 50 percent by mol acrylonitrile. However, there can be used an acrylic copolymer of a composition in which acrylonitrile is less than 50 percent by mol and the rest is a monomer having a hydroxyl group and/or a monomer capable of forming a hydroxyl group and any other unsaturated monomer which is introduced properly as required. Further, in so far as no remarkably adverse influence is given to the produced lactonized acrylic fiber, a part of the acrylonitrile can be replaced with such unsaturated monomer capable of forming a carboxyl group as methyl acrylate, ethyl acrylate, methyl methacrylate, acrylamide or methacrylamide so that he carboxyl group formed by the lactonizing reaction according to the process of the present invention may be utilized for the formation of lactone ring.

The thus obtained acrylic copolymer may be shaped into a fiber by any well known spinning process such as wet or dry-spinning process.

According to the present invention, a lactonized acrylic fiber retaining a very high elongation at break, improved in such physical properties as the Young's modulus and strength, having an excellent flame-resistance can be obtained by lactonizing acrylic fiber having had the solvent removed as much as possible, for example, a water-washed gel fiber, unstretched fiber, stretched fiber, relaxed fiber, heat-treated fiber, spun yarn or knitted or woven fabric so that a lactone ring may be formed in said fiber.

The invention will be further explained by referring to the following Examples which are given for illustration purpose and not to limit the scope of the present invention. The percentages and parts shown in these Examples are all by weight unless otherwise specified. The content of lactone unit shown in Examples 1 to 4 is represented by the percentage by weight on the fiber of a group of

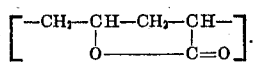

The analysis was conducted in a manner based on the method mentioned on pages 142 to 154 of "Chemistry of High Polymers" ("Kobunshi Kagaku" in Japanese) Vol. 7 (1950). Thus a copolymer of a known amount of lactone unit was made from a copolymer of methyl acrylate and vinyl acetate and the infrared absorption bond of 1176 cm$^{-1}$ of said copolymer was used as a criterion to measure the strength in the same absorption bond of a lactonized acrylic fiber obtained by an acid-treatment.

EXAMPLE 1

A spinning solution was prepared by dissolving 10 parts of a copolymer consisting of 89 percent acrylonitrile and 11 percent vinyl acetate in 90 parts of a 45 percent aqueous solution of sodium thiocyanate. The spinning solution was extruded through a spinning nozzle having 100 orifices of an orifice diameter of 0.09 mm. into a 12 percent aqueous solution of sodium thiocyanate at 0°C. to form coagulated filaments. The filament was stretched twice the original length in the coagulating bath, then washed with water and further stretched 10 times the original length in boiling water, and was then dried in hot air at 115°C. under a relative humidity of 20 percent and was relaxed in a pressurized steam at 117°C. to make a fiber (sample A).

10 parts of the thus obtained fiber A were dipped in 1000 parts of 20 percent aqueous solution of sulfuric acid at 100°C. for 2 hours (sample B) or 4 hours (sample C), were then taken out, washed with water, and further dipped in an aqueous solution of sodium hydroxide of a pH of 10 at 80°C. for 1 minute, and then washed with water and dried. The lactone unit contents and physical properties of the thus obtained samples B and C were measured and the results are indicated in Table 1.

On the other hand, for comparison, 20 parts of a copolymer consisting of 89 percent acrylonitrile and 11 percent vinyl acetate were dispersed in 100 parts of a 20 percent aqueous solution of sulfuric acid, and the mixture was heated while being stirred and boiled continuously for 5 hours so as to be lactonized. Then the solid was well washed with water to obtain a lactonized acrylic polymer containing 10 percent of lactone unit. The thus obtained lactonized acrylic polymer was spun into filaments, which were stretched, dried and relaxed in the same manner as mentioned above to make a fiber (sample D). The physical properties of said fiber D are also indicated in Table 1.

TABLE 1

| Samples | Physical properties: Lactone unit content (%) | Strength at break (g/d) | Elongation at break (%) | Young's modulus at 20°C. (g/d) | Young's modulus in hot water at 95°C. (g/d) |
|---|---|---|---|---|---|
| Sample A (untreated) | 0 | 3.3 | 45 | 43 | 0.5 |
| Sample B (by the process of the present invention) | 5 | 3.8 | 48 | 50 | 0.8 |
| Sample C (by the process of the present invention) | 10 | 3.5 | 45 | 52 | 1.1 |
| Sample D (by the conventional process) | 10 | 3.8 | 25 | 55 | 1.0 |

As compared with the untreated fiber (sample A), the samples B and C obtained by the process of the present invention were remarkably improved in the Young's modulus and were substantially the same in the elongation at break but the sample D was remarkably low in the elongation at break.

When the samples C and D were heated and stretched 1.2 to 1.5 times the length on a hot plate at 150°C., the sample C could be well stretched to be up to 1.5 times the length but the sample D was partly broken when stretched 1.4 times the length and could be stretched no more. The stretched fibers were treated in boiling water for 15 minutes. The results of measuring the shrinkages are shown in Table 2.

TABLE 2 Shrinkages (%)

| Samples | Stretching magnification (times) | | | |
|---|---|---|---|---|
| | 1.2 | 1.3 | 1.4 | 1.5 |
| C | 21 | 23 | 25 | 26.5 |
| D | 18 | 20 | (impossible to stretch) | |

Further, the sample C and the fiber of the sample C as stretched 1.5 times the length and the sample D and the fiber of the sample D as stretched 1.3 times the length were respectively mixed at a ratio of 50:50 to make two kinds of spun yarns. When the yarns were dipped in boiling water for 15 minutes and were then dried at 105°C., the former yarn was much higher in the bulkiness and hand than the latter yarn.

EXAMPLE 2

10 parts of the sample A obtained in Example 1 were treated with 1 liter of a 30 percent aqueous solution of nitric acid containing 8 parts of sodium chlorate at 90°C. for 1 hour, or with 1 liter of a 20 percent aqueous solution of perchloric acid at 100°C. for 2 hours, or with 1 liter of a 40 percent aqueous solution of para-toluenesulfonic acid at 100°C. for 4 hours, and were then washed with water and dried. The lactone unit contents in the thus obtained treated fibers were respectively 10.5, 9 and 8 percent.

EXAMPLE 3

100 g. of a relaxed side-by-side type composite acrylic fiber consisting of an acrylic copolymer consisting of 89 percent acrylonitrile and 11 percent vinyl acetate and an acrylic copolymer consisting of 90 percent acrylonitrile and 10 percent methyl acrylate were dipped in 500 parts of a mixed solution consisting of 20 parts of sulfuric acid, 1.6 parts of zinc sulfate, 3.3 parts of 60 percent perchloric acid and 80 parts of water at 100°C. for 30 minutes or 2 hours so as to be lactonized. The lactonized fibers were then washed with water and dried. The lactone unit contents and physical properties of the thus obtained treated fibers are as indicated in Table 3.

Table 3

| Fibers | Physical properties | | | | |
|---|---|---|---|---|---|
| | Lactone unit content (%) | Strength at break (g/d) | Elongation at break (%) | Young's modulus at 20°C. (g/d) | Young's modulus in hot water tm at 95°C. (g/d) |
| Untreated fiber | 0 | 3.7 | 39 | 45 | 0.6 |
| Fiber treated for 30 min. | 3 | 3.7 | 35 | 52 | 0.8 |
| Fiber treated for 2 hours | 5.3 | 3.5 | 37 | 50 | 1.0 |

EXAMPLE 4

A spinning solution was prepared by dissolving 12 parts of an acrylic copolymer consisting of 80 parts of acrylonitrile, 20 parts of vinyl acetate and 0.3 part of methallylsulfonic acid in 88 parts of 48 percent aqueous solution of sodium thiocyanate. The spinning solution was extruded through a spinning nozzle having 50 orifices of an orifice diameter of 0.09 mm. into 12 percent aqueous solution of sodium thiocyanate at −3°C., to form filaments, which were washed with water and then stretched 10 times the original length in boiling water. The thus obtained gel fiber was fixed to a polytetrafluoroethylene coated metal frame so as to have a relaxation of 20 percent, was then dipped in a mixed solution consisting of 20 parts of sulfuric acid, 1.6 parts of zinc sulfate, 10 parts of 60 percent perchloric acid and 70 parts of water at 90°C. for 2 hours. Then the fiber was washed with water, dried with hot air at 105°C., relaxed in a pressurized steam at 120°C. and then dried. The thus obtained lactonized acrylic fiber (lactone unit content 18 percent) had very excellent physical properties, i.e. strength at break of 3.5 g/d elongation at break of 45 percent and Young's modulus in hot water at 95°C. of 0.9 g/d.

On the other hand, when the fiber was treated in the same manner by using water instead of the acid medium and was then dried and relaxed, it shrank so remarkably that no satisfactory fiber was obtained.

EXAMPLE 5

A fiber was made by the same process as in Example 1 from a copolymer consisting of 90 percent acrylonitrile, 4.5 percent methyl acrylate, 5 percent allyl alcohol and 0.5 percent methallylsulfonic acid. 10 parts of the thus obtained fiber were treated in 500 parts of a mixed solution consisting of 15 parts of sulfuric acid, 10 parts of paratoluenesulfonic acid and 75 parts of water at 100°C. for 3 hours and were washed with water, and dried.

From the difference between the contents of allyl alcohol before and after the acid-treatment, the lactone unit content in said treated fiber was determined to be 5.5 percent. The elongation at break of the treated fiber was 40 percent.

EXAMPLE 6

A knitted fabric was made in an ordinary manner by using a spun yarn of the sample A in Example 1. The fabric was treated for 2 hours in the same acid medium as in Example 3, was then washed with water, dipped in an aqueous solution of sodium hydroxide of a pH of 10 at 80°C. for 2 minutes, was then again washed with water and was dried. As compared with a knitted fabric not acid-treated, the thus obtained knitted fabric was excellent in the wrinkle recovery and had a peculiar crimp touch. Further, even after it was laundered, its dimentional stability was high and substantially no collapse was observed.

EXAMPLE 7

A spinning solution was prepared by dissolving 10 parts of an acrylic copolymer consisting of 95 percent acrylonitrile and 5 percent vinyl acetate in 90 parts of 50 percent aqueous solution of sodium thiocyanate. The spinning solution was extruded through a spinning nozzle having 150 orifices of an orifice diameter of 0.07 mm. into 12 percent aqueous solution of sodium thiocyanate at −3°C. to form filaments, which were stretched twice the original length in the coagulating bath and washed with water and then further stretched 5 times the length and then dried in hot air at 120°C. under a relative humidity of 20 percent. The thus obtained fiber was dipped in 15 percent aqueous solution of sulfuric acid, was then squeezed so as to be twice the dry weight and was treated in a pressurized steam at 140°C. for 1 hour so as to be lactonized simultaneously with being relaxed. The thus obtained lactonized acrylic fiber was of a lactone unit content of 4 percent.

What we claim is:

1. In a process for producing lactonized acrylic copolymers, containing at least 1 percent by weight of lactone units produced by treating an acrylic polymer with an acidic medium having a pH of not more than 2, said medium containing at least one acid selected from the group consisting of chloracetic acid, formic acid, toluenesulfonic acid, phenolsulfonic acid, sulfuric acid, hydrochloric acid, nitric acid, perchloric acid, phosphoric acid, chlorosulfonic acid, chloric acid, chlorous acid and hypochlorous acid in such concentrations so as not to swell or dissolve the treated acrylic polymer, the improvement wherein the acrylic polymer subjected to the lactonization treatment in the acidic medium is a fiber made from an acrylic copolymer containing at least 50 mol percent of acrylonitrile and a monomer selected from the group consisting of monomers containing a hydroxyl group, monomers capable of forming a hydroxyl group, and mixtures thereof.

2. The improvement according to claim 1, wherein the lactonized acrylic fiber contains at least 3 percent by weight of lactone units.

3. The improvement according to claim 1, wherein the lactonized acrylic fiber contains less than 30 percent by weight of lactone units.

4. The improvement according to claim 1, wherein the fiber to be treated is a composite fiber.

5. The improvement according to claim 1, wherein the fiber to be treated is selected from the group consisting of a gel fiber, a fiber subjected to after-treatment a fiber which constitutes a spun yarn, a knitted fabric and a woven fabric.

6. The improvement according to claim 1, wherein the monomer containing a hydroxyl group is selected from the group consisting of allyl alcohol and methallyl alcohol.

7. The improvement according to claim 1, wherein the monomer capable of forming a hydroxyl group is selected from the group consisting of vinyl compounds of carboxylic acids, allyl compounds of carboxylic acids, vinyl compounds of ethers, allyl compounds of ethers and compounds thereof substituted with a substituent selected from the group consisting of halogen atoms, hydrocarbon groups and halohydrocarbon groups.

8. The improvement according to claim 1, wherein the monomer capable of forming a hydroxyl group is a vinyl ester of a fatty acid.

9. The improvement according to claim 8, wherein said vinyl ester is vinyl acetate or vinyl propionate.

10. The improvement according to claim 1, wherein the acrylic copolymer consists of (1) at least 50 percent by mol of acrylonitrile, (2) a monomer selected from the group consisting of monomers containing a hydroxyl group, monomers capable of forming a hydroxyl group and mixtures thereof, and (3) at least one monomer selected from the group consisting of allyl sulfonic acid, methallylsulfonic acid and their salts, styrene, vinyl chloride, vinyl bromide and vinylidene chloride.

* * * * *